(No Model.)
A. WECKER.
APPARATUS FOR THE MANUFACTURE OF VINEGAR.
No. 300,928. Patented June 24, 1884.
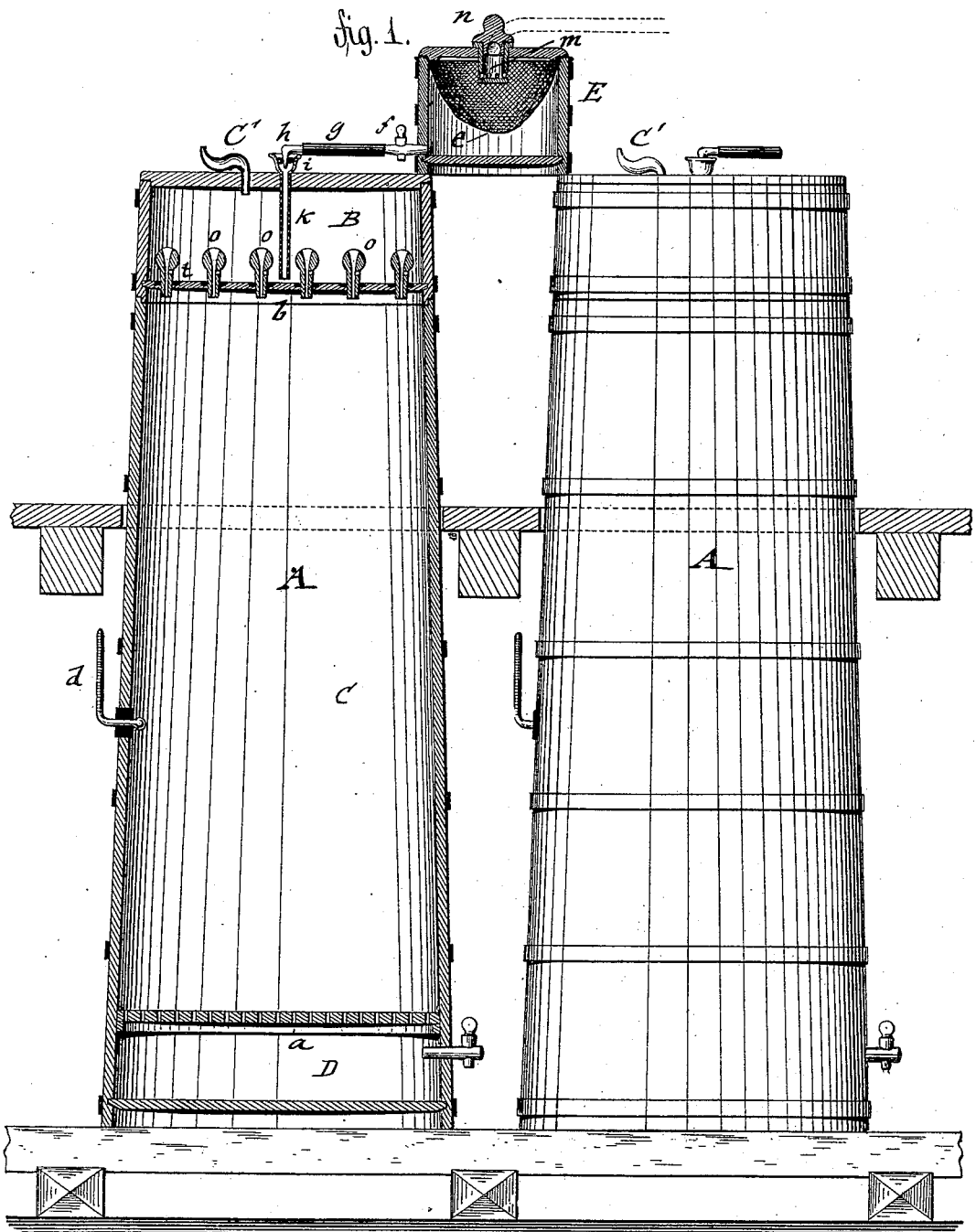
WITNESSES:
INVENTOR
Adolf Wecker
BY
Goepel & Raegener
ATTORNEYS
N. PETERS. Photo-Lithographer, Washington, D. C.

United States Patent Office.

ADOLF WECKER, OF HEILBRONN, WÜRTEMBERG, GERMANY.

APPARATUS FOR THE MANUFACTURE OF VINEGAR.

SPECIFICATION forming part of Letters Patent No. 300,928, dated June 24, 1884.

Application filed January 22, 1884. (No model.) Patented in Germany April 24, 1883, No. 25,670.

*To all whom it may concern:*

Be it known that I, ADOLF WECKER, a citizen of the city of Heilbronn, in the Kingdom of Würtemberg, German Empire, have invented certain new and useful Improvements in Apparatus for the Manufacture of Vinegar, (for which Letters Patent have been granted to me heretofore by the government of Germany under date of April 24, 1883, No. 25,670,) of which the following is a specification.

My invention relates to improvements in apparatus for the manufacture of vinegar by the quick process; and it consists, principally, in the combination, with a graduator, of a reservoir for the wash, which reservoir is provided with a filtering-net; secondly, of a conical glass tube for dripping the wash into the graduator; thirdly, of a peculiar arrangement of tubes, with lateral openings inserted into the upper shelf of the graduator; and, lastly, of a bent glass pipe or trap for the escape of air and the condensation of acetic vapors.

In the accompanying drawings, Figure 1 represents a vertical central section and a side view of a graduator, and Fig. 2 shows a section of one of the drip-tubes drawn on a larger scale.

Similar letters of reference indicate corresponding parts.

In the drawings, A represents a graduator; $a$ and $b$, perforated shelves dividing the graduator into three chambers, B, C, and D. C' is a trap at the top of the chamber B, through which the air escapes; $d$, a thermometer inserted into the chamber C in the usual manner. E is a reservoir located at a higher level and close to the top of the graduator A; $m$, a laterally-perforated funnel, with a removable cover, $n$. $l$ represents a filtering-net suspended within the reservoir E. $f$ is a faucet at the bottom of the same; $g$, a rubber hose connecting the faucet $f$ with a bent glass tube, $h$, the lower part of which is drawn out to a cone the end of which is ground off to form a small drip-opening of the desired diameter. K is a glass funnel, which projects into chamber B nearly down to the shelf $b$. A perforated cork disk, $i$, fits into the upper part of the funnel and receives the conical end of the glass tube $h$, the position of which may be adjusted vertically by sliding the cork disk $i$ up or down in the top of the funnel K. Into the perforations of the shelf $b$ are inserted bushings $p$, of cork or other suitable elastic material, as shown in detail in Fig. 2, which form a packing for the tubes $o$, which are made of wood and closed at the top by a cork, $s$, or by other means. Each tube $o$ is provided with one or more lateral openings, $t$, the distance of which from the bottom of the chamber B is regulated by sliding the tubes $o$ up or down within the cork bushings $p$. In place of wooden tubes $o$, glass tubes, bent at right angles, may be used, or tubes of other suitable material.

The wash or diluted alcoholic liquor to be acetified is conducted into the reservoir E, through the funnel $m$, and is filtered through the net $e$, which retains the impurities carried along by the liquor, and prevents thereby the choking of the glass tube $h$, the end opening of which is ground to the desired dimensions, by which means the flow can be much more accurately adjusted than by means of a faucet. The mouth of the pipe $h$ is centrally adjusted within the funnel K, so that the liquid will drop down through the funnel without touching its sides, and in striking the liquid on the shelf $b$ produce a sound which is easily heard from the outside, so that the attendant is thereby enabled to satisfy himself of the proper working of the apparatus. From the chamber B the wash passes through the tubes $o$ to the shavings in the intermediate chamber, C. By the adjustment of the tubes $o$ the depth of liquid above the shelf $b$ can be regulated. The shelf $b$ is not required to be made very thick, as there is no danger of undue pressure upon the shelf, as in the case of a simple perforated bottom with wicks, heretofore in use, which wicks may become choked. The air passes off from the top of the graduator through the bent glass pipe or trap C', where the greater part of the vapor is condensed and returned to the graduator in liquid form.

I am aware that prior to my invention elevated reservoirs have been used in combination with vinegar vats or graduators; also, that tubes with a lateral opening have been inserted into the upper shelf of the graduator; and I, therefore, do not claim these features broadly.

Having thus described my invention, I claim as new and desire to secure by Letters Patent—

1. In an apparatus for making vinegar, the combination of a graduator with an elevated reservoir, provided with a filtering-net, and means for conducting the wash from the reservoir to the graduator, substantially as and for the purpose specified.

2. In an apparatus for making vinegar, the combination of an elevated reservoir having a filtering-net, a graduator, and a glass tube, connected with the reservoir and provided with a downwardly-bent conical end extending into the conducting-funnel of the graduator, substantially as and for the purpose specified.

3. In an apparatus for making vinegar, a graduator having an upper perforated shelf, conducting-tubes having lateral openings, and bushings of elastic material inserted into the perforations of said shelf, for tightly retaining said tubes, substantially as and for the purpose specified.

In testimony that I claim the foregoing as my invention I have signed my name in presence of two subscribing witnesses.

ADOLF WECKER.

Witnesses:
 ROBERT RAENECK,
 BRUNO KEISER.